(12) United States Patent
O'Connell

(10) Patent No.: US 10,499,615 B2
(45) Date of Patent: Dec. 10, 2019

(54) MULTIPLE VECTOR TENSION DISPLACEMENT SYSTEM

(71) Applicant: Amanda O'Connell, Jersey City, NJ (US)

(72) Inventor: Amanda O'Connell, Jersey City, NJ (US)

(*) Notice: Subject to any disclaimer, the term of this patent is extended or adjusted under 35 U.S.C. 154(b) by 303 days.

(21) Appl. No.: 15/308,695

(22) PCT Filed: May 5, 2015

(86) PCT No.: PCT/US2015/029204
§ 371 (c)(1),
(2) Date: Nov. 3, 2016

(87) PCT Pub. No.: WO2015/171587
PCT Pub. Date: Nov. 12, 2015

(65) Prior Publication Data
US 2017/0251639 A1 Sep. 7, 2017

Related U.S. Application Data

(60) Provisional application No. 61/989,474, filed on May 6, 2014.

(51) Int. Cl.
*A01K 27/00* (2006.01)
(52) U.S. Cl.
CPC .......... *A01K 27/003* (2013.01); *A01K 27/002* (2013.01); *A01K 27/005* (2013.01)

(58) Field of Classification Search
CPC ... A01K 27/003; A01K 27/002; A01K 27/005
See application file for complete search history.

(56) References Cited

U.S. PATENT DOCUMENTS

| | | | | |
|---|---|---|---|---|
| 2,289,802 A | * | 7/1942 | Norton | A01K 27/001 119/793 |
| 2,778,335 A | * | 1/1957 | Hirsch | A01K 37/00 119/793 |
| 2,994,300 A | * | 8/1961 | Grahling | A01K 27/005 119/770 |
| 3,441,005 A | * | 4/1969 | Fink | A01K 27/005 119/798 |
| 4,252,084 A | * | 2/1981 | Willow | A01K 27/003 119/771 |
| 4,638,764 A | * | 1/1987 | Anderson | A01K 27/00 119/770 |
| 4,729,345 A | * | 3/1988 | Anderson | A01K 27/00 119/770 |
| 4,741,288 A | * | 5/1988 | Anderson | A01K 25/00 119/831 |
| 4,838,206 A | * | 6/1989 | Anderson | A01K 25/00 119/831 |
| 5,038,719 A | * | 8/1991 | McDonough | A01K 27/00 119/772 |
| 5,471,953 A | * | 12/1995 | Sporn | A01K 27/002 119/792 |
| 5,483,925 A | * | 1/1996 | Childress | A01K 1/0272 119/795 |

(Continued)

*Primary Examiner* — Joshua D Huson

(57) ABSTRACT

The present invention is directed to a multiple vector tension displacement system which adjusts to the size of a wearer, wherein the size adjustment allows for maximum tension displacement when in use.

5 Claims, 3 Drawing Sheets

(56) References Cited

U.S. PATENT DOCUMENTS

| | | | | |
|---|---|---|---|---|
| 5,632,234 A | * | 5/1997 | Parker | A01K 27/003 119/795 |
| 5,701,848 A | * | 12/1997 | Tozawa | A01K 27/003 119/795 |
| 5,706,764 A | * | 1/1998 | Irbinskas | A01K 27/005 119/792 |
| 5,732,660 A | * | 3/1998 | David | A01K 25/00 119/792 |
| 5,735,234 A | * | 4/1998 | May | A01K 1/04 119/795 |
| 5,791,295 A | * | 8/1998 | Schmid | A01K 27/003 119/793 |
| 5,794,571 A | * | 8/1998 | Goldberg | A01K 1/0263 119/771 |
| 6,029,611 A | * | 2/2000 | Hershauer | A01K 1/0272 119/771 |
| 6,053,128 A | * | 4/2000 | McCulloch | A01K 27/001 119/792 |
| 6,237,539 B1 | * | 5/2001 | Sporn | A01K 27/003 119/771 |
| 6,439,168 B1 | * | 8/2002 | Maglich | A01K 27/003 119/792 |
| 6,539,897 B1 | * | 4/2003 | Dossenback | A01K 27/003 119/795 |
| 6,595,156 B1 | * | 7/2003 | Curran | A01K 25/00 119/792 |
| 6,619,238 B1 | * | 9/2003 | Amato | A01K 27/003 119/792 |
| 6,701,873 B2 | * | 3/2004 | Fradette, II | A01K 1/04 119/784 |
| 6,796,274 B1 | * | 9/2004 | Moynihan, III | A01K 25/00 119/831 |
| 6,971,334 B1 | * | 12/2005 | Livesay | A01K 27/003 119/792 |
| D552,805 S | * | 10/2007 | Holt, Jr. | A01K 27/00 D30/152 |
| 8,051,808 B2 | * | 11/2011 | Mugford | A01K 27/002 119/771 |
| 8,267,050 B1 | * | 9/2012 | Hatcher | 119/795 |
| 8,327,808 B2 | * | 12/2012 | Chirico | A01K 27/003 119/792 |
| 8,365,685 B2 | * | 2/2013 | Simons | A01K 1/0613 119/756 |
| 8,505,495 B2 | * | 8/2013 | Wang | A01K 27/003 119/797 |
| 8,869,750 B2 | * | 10/2014 | Lady | A01K 27/002 119/792 |
| 8,925,496 B2 | * | 1/2015 | Simons | A01K 1/04 119/756 |
| 9,119,378 B2 | * | 9/2015 | Schlosser | A01K 27/005 |
| 9,271,476 B1 | * | 3/2016 | Flynn | A01K 27/003 |
| 9,392,769 B2 | * | 7/2016 | Van Bemmelen | A01K 27/003 |
| 9,480,240 B2 | * | 11/2016 | Sinko | A01K 27/001 |
| 2006/0032461 A1 | * | 2/2006 | Sporn | A01K 27/003 119/797 |
| 2006/0070584 A1 | * | 4/2006 | Larouche | A01K 27/004 119/795 |
| 2006/0201450 A1 | * | 9/2006 | Jordan | A01K 27/004 119/796 |
| 2007/0157892 A1 | * | 7/2007 | Farrell | A01K 27/003 119/795 |
| 2007/0266960 A1 | * | 11/2007 | Mugford | A01K 27/002 119/792 |
| 2009/0199787 A1 | * | 8/2009 | Weinberg | A01K 27/003 119/797 |
| 2009/0308329 A1 | * | 12/2009 | Sanchez | A01K 27/003 119/795 |
| 2010/0050957 A1 | * | 3/2010 | Elkins | A01K 1/04 119/793 |
| 2011/0083616 A1 | * | 4/2011 | Elkins | A01K 1/04 119/792 |
| 2012/0000432 A1 | * | 1/2012 | Guiant | A01K 15/02 119/792 |
| 2012/0167833 A1 | * | 7/2012 | Clayton | A01K 27/003 119/795 |
| 2012/0192810 A1 | * | 8/2012 | Bemmelen | A01K 27/003 119/795 |
| 2012/0247398 A1 | * | 10/2012 | Poch | A01K 27/003 119/795 |
| 2013/0074783 A1 | * | 3/2013 | Chapin | A01K 27/004 119/796 |
| 2013/0133591 A1 | * | 5/2013 | Silva | A01K 27/003 119/793 |
| 2013/0167782 A1 | * | 7/2013 | Poch | A01K 27/003 119/795 |
| 2015/0101548 A1 | * | 4/2015 | Amos | A01K 27/003 119/793 |
| 2015/0150221 A1 | * | 6/2015 | Schlosser | A01K 27/003 119/795 |
| 2015/0150222 A1 | * | 6/2015 | Schlosser | A01K 27/003 119/797 |
| 2015/0223432 A1 | * | 8/2015 | Lund | A01K 27/003 119/792 |
| 2015/0237831 A1 | * | 8/2015 | Beck | A01K 27/003 119/795 |

* cited by examiner

MULTIPLE VECTOR TENSION DISPLACEMENT SYSTEM

CROSS-REFERENCE TO RELATED APPLICATIONS

This application claims priority to U.S. Provisional Application No. 61/989,474 filed May 6, 2014; incorporated herein in its entirety.

FIELD OF THE INVENTION

The invention is directed to multiple vector tension displacement animal restrain system

BACKGROUND OF THE INVENTION

Many dog leashes currently exist which are used for the task of dog walking, running and related activities, including dog sports. Each type of leash may incorporate different designs so as to adjust to the particular task or activity. These leashes can be of simple or complex design with various attachments for ease in use and increased security.

Security and strength of leash are important to ensure brakeage does not occur allowing the animal to run free and potentially be injured, stolen or lost. Resistant to brakeage must be accomplished without the requirement of costly components or incurring increase weight to the leash, animal and leash user. Thus other concepts which do not add weight, cost etc, to the leash may provide the necessary requirements for a secure and commercially successful leash.

There still exists today the need for a leash that incorporates technology to disperse vector forces while being light weight and cost effective.

BRIEF SUMMARY OF THE INVENTION

The present invention provides a multiple vector tension displacement system which adjusts to the size of the animal, wherein the size adjustment allows for maximum tension displacement when in use.

In a first embodiment, the invention is directed to a multiple vector tension displacement animal restrain system including a first portion having a first end and second end, and a second portion having a first end and second end, the second portion extending from the first portion by a substantially ring-shaped device attached to the first end of the second portion. A harness portion is attached to the second end of the first portion and second end of the second portion. A tension displacement device positioned surrounding the substantially ring-shaped device, wherein the tension displacement device is adjustable along the first portion.

In another embodiment the invention is directed to a method to attach a multiple vector tension displacement animal restrain system to animal including the steps of attaching the multiple vector tension displacement animal restrain system to an animal. Once attached, adjusting the multiple vector tension displacement animal restrain system based on the dimensions of an animal so as to align the multiple vector tension displacement animal restrain system to provide the least amount of tension on the system and animal.

DETAILED DESCRIPTION OF THE INVENTION

Certain terminology is used herein for convenience only and is not to be taken as a limitation on the present invention. The terminology includes the words specifically mentioned, derivatives thereof and words of similar import. The embodiments discussed herein are not intended to be exhaustive or to limit the invention to the precise form disclosed. These embodiments are chosen and described to best explain the principle of the invention and its application and practical use and to enable others skilled in the art to best utilize the invention.

Figure 1:
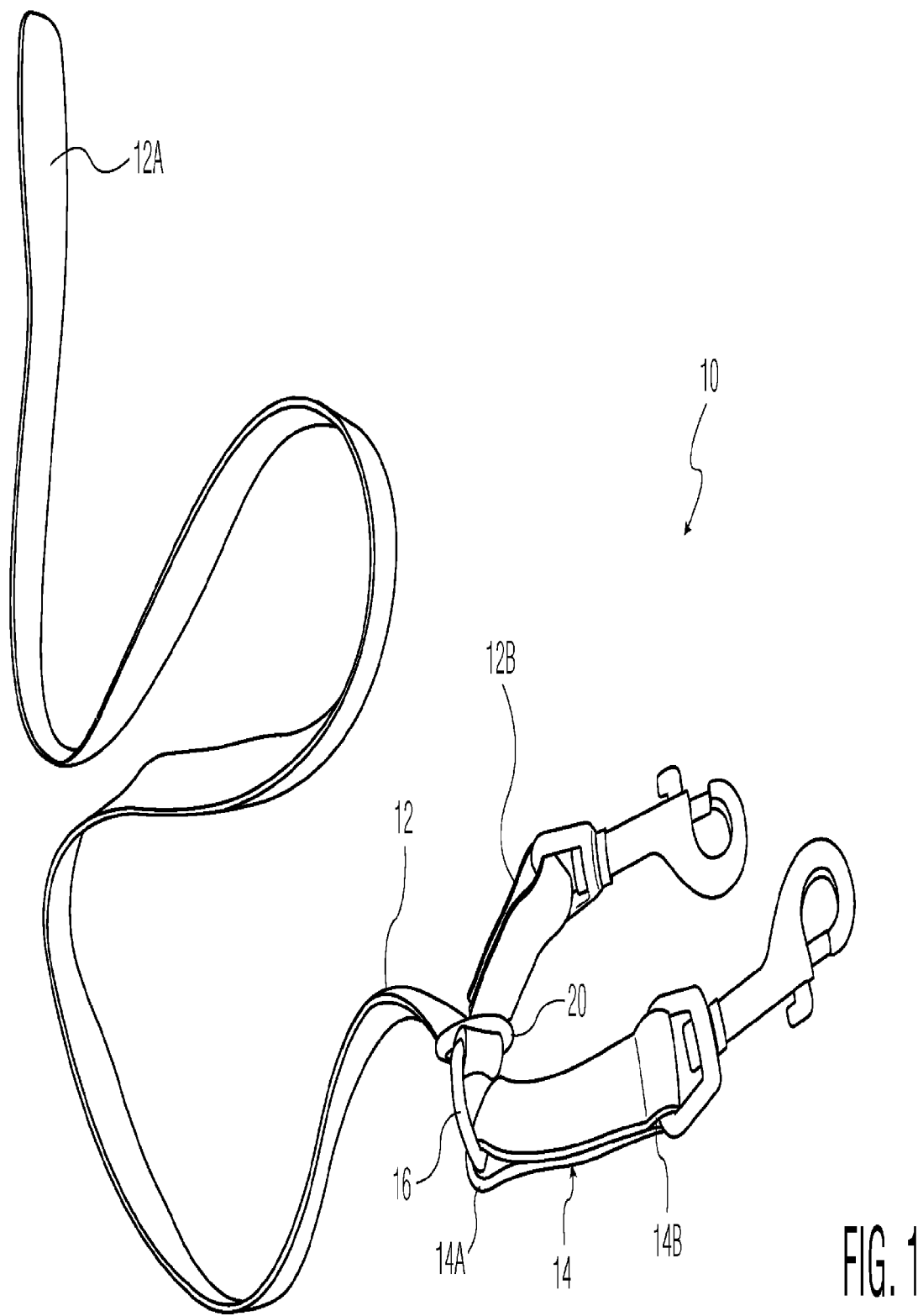
FIG. 1 is a plan view of the present invention.
Figure 2:
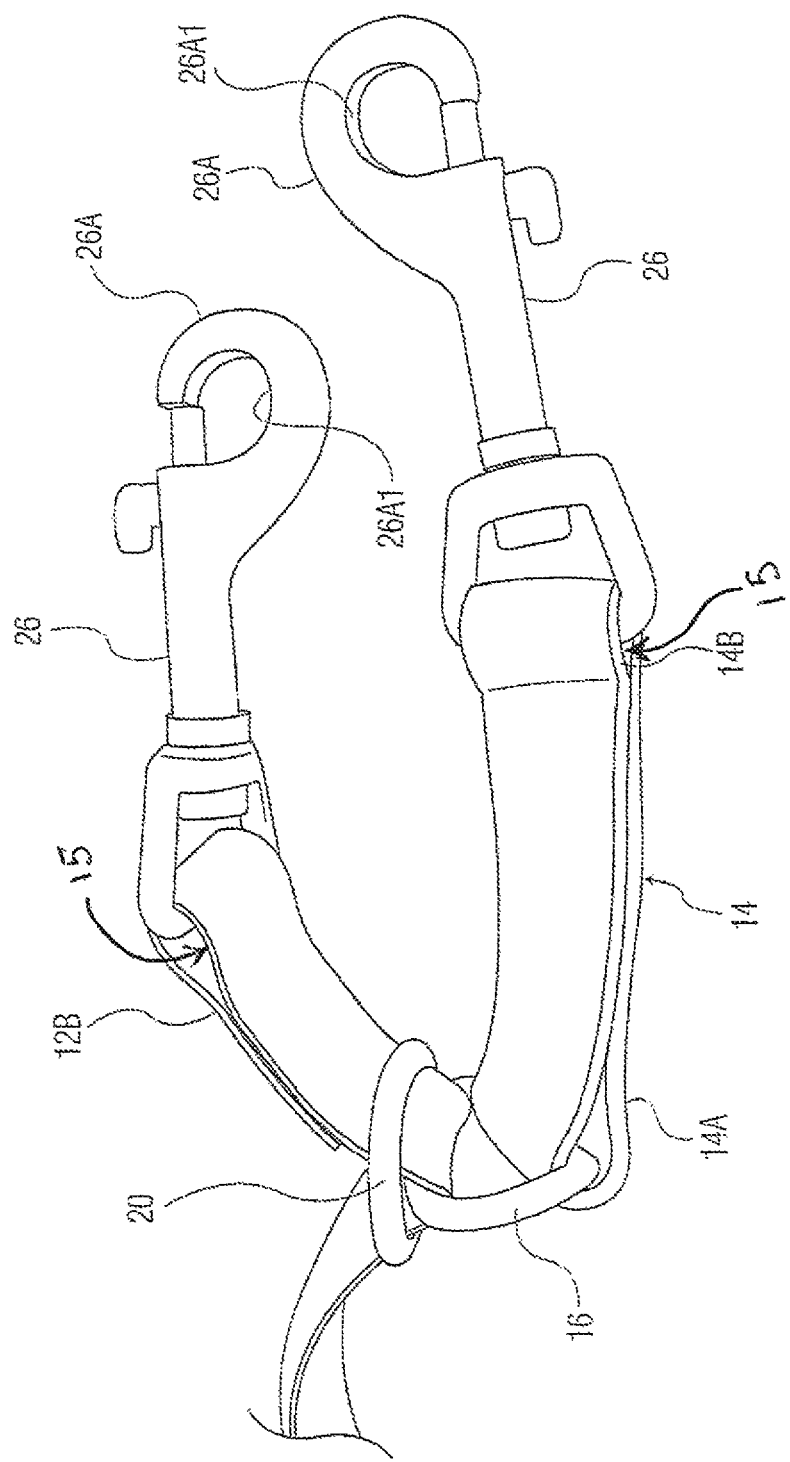
FIG. 2 is an enlarged view of the second end of the first portion and second portion of the present invention.
Figure 3:
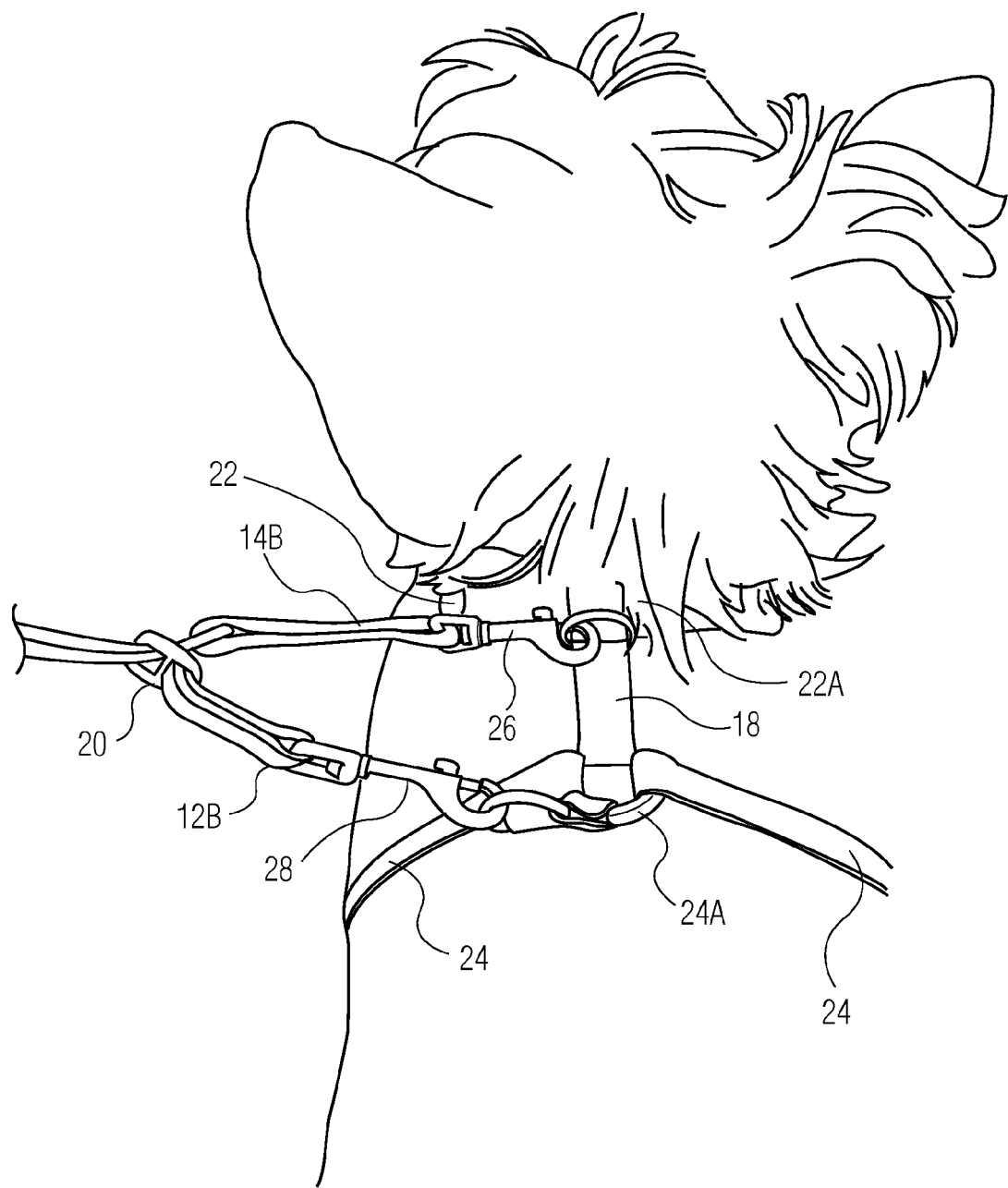
FIG. 3 is an enlarged view of the second end of the first portion and second portion of the present invention attached to an animal.

Referring to FIGS. 1-3, in a first embodiment, the invention is directed to a multiple vector tension displacement animal restrain system 10. The present invention is based on a design which provides 1) tension displacement to reduce or eliminate the possibility of the leash "breaking", 2) a dual "connection" alignment as a "fail safe" if one portion breaks, and 3) the ability to adjust the "fit" of the leash to ensure maximum tension displacement.

The present embodiment includes a first portion 12 having a first end 12A and second end 12B and a second portion 14 having a first end 14A and second end 14B, the second portion 14 extending from the first portion 12 by a substantially ring-shaped device 16 attached to the first end 14A of the second portion 14. The ring-shaped device 16 can preferably be "D-shaped" so that the first end 14A of the second portion 14 can be attached "flat" to disperse the greatest amount of tension (created by the pulling of the animal). A harness 18 portion attached to the second end 12B of the first portion 12 and second end 14B of the second portion 14 provides dual locations for attachment of the system 10 to an animal. This dual attachment of the system 10 allows comfort to the animal and provides multiple vectors to reduce tension.

A tension displacement device 20 positioned surrounding the substantially ring-shaped device disperses the tension provided by the pulling by the animal via the first portion 12 and second portion 14. The ring-shaped device 16 will allow the system 10 to be adjustable and lock in place should the first portion 12 or second portion 14 fail. Moreover, adjustment of the ring-shaped device 16 allows the first portion 12 and second portion 14 to be aligned with the tension displacement device 20 based on the size of the animal in the system so as to decrease the tension from the animal in the greatest amount while provided a comfortable fit.

The material used for the first portion 12 and second portion 14 are most commonly a sturdy pliable type material which has limited stretching ability. Without being limiting to any particular material, nylon is a common selection. The tension displacement device 20, ring-shaped device 16 and connection devices 26 are most commonly metals, which are commercially available. Each of the individual components of the system 10 are common commercial available items so as to make the system cost effective.

Referring to FIG. 3, the harness portion 18 has a collar portion 22 releasably attached to the second end 14B of the second portion 14, and a body portion 24 releasably attached to the second end 12B of the first portion 12. The second end 12B of the first portion 12 and second portion 14B are overlapped and attached forming a traversing opening.

The collar portion 22 and body portion 24 have attachment devices 22A, 24A for securing releasable connection devices 26, wherein the connection devices 26 have a first end 26A to secure the collar portion and body portion to the second end 12B, 14B of the first portion 12 and second portion 14. The cellar portion 22 and body portion 24 have attachment devices 22A, 24A for securing releasable connection devices 26, wherein the connection devices 26 have a first end 26A to secure the collar portion 22 and body portion 24 to the second end 12B, 14B of the first portion 12 and second portion 14.

As best illustrated in FIG. 2, the first end of the releasable connection devices 26A have a curved surface 26A1 which allow the releasable connection devices 26 to be aligned as they are adjusted to the size of the animal in the system 10. As discussed, this alignment allows for the greatest amount of tension displacement by the tension displacement device 20.

In another embodiment, the invention is directed to a method to attach the multiple vector tension displacement animal restrain system of the present invention to an animal. The includes the steps of attaching the multiple vector tension displacement animal restrain system to an animal. After attaching the tension displacement animal restrain system of the previous embodiment, adjusting the multiple vector tension displacement animal restrain system based on the dimensions of an animal so as to align the multiple vector tension displacement animal restrain system to provide the least amount of tension on the system and animal. A key aspect of the present invention is its ability to configure its dimensions so as to align to "disperse" tension (as the animal "pulls") on the leash. The components of the system, illustrated in FIGS. 1, 2 and 3, are required to be designed to allow this "configuring" of the dimensions for optimal use to control tension and reduce or eliminate the probability of the leash breaking.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A multiple vector tension displacement animal restrain system comprising:
   a. a leash defining a first strap having a first portion (12) having a non-overlapping first end (12A) configured to be held in use and an overlapping second end (12B), the second end (12B) comprising a securing device 26, wherein at least a portion of the non-overlapping first end (12A) is positioned within a tension displacement device (20) such that the non over lapping first end enters and exits the tension displacement device through a first side of an opening that defines the tension displacement device such that only the non-overlapping first end (12A) of the first portion (12) contacts the tension displacement device;
   b. a second strap defining an overlapping second portion (14) having an overlapping first end and an overlapping second end, the overlapping second portion extending from the first portion by a substantially ring-shaped device (16) separately attached to the overlapping first end of the overlapping second portion, such that the non-overlapping first end enters through the tension displacement device first side, looped through the substantially ring shaped device positioned on a second side of the tension displacement device and exits back through the opening to the first side of the tension displacement device;
   c. a harness portion attached to the overlapping second end of the first portion and the overlapping second end of the overlapping second portion wherein the harness portion is configured to be attached to a single animal during use,
   wherein the a tension displacement device (20) contacts the first portion non-overlapping first end at two separate contact points interrupted by contact of the first portion through the substantially ring-shaped device (16) thereby creating a "v" type formation in the non-overlapping first end (12A) of the first portion (12), and wherein the tension displacement device is adjustable along the non-overlapping first end (12A) of the first portion (12).

2. The system of claim 1, wherein the harness portion has a collar portion releasably attached to the overlapping second end of the overlapping second portion, and a body portion releasably attached to the overlapping second end of the first portion.

3. The system of claim 2, wherein the overlapping second end of the first portion and second portion are overlapped and attached forming a traversing opening.

4. The system of claim 3, wherein the collar portion and body portion have attachment devices for securing releasable connection devices, wherein the releasable connection devices have a first end to secure the collar portion and body portion to the overlapping second end of the first portion and overlapping second portion.

5. A method to attach a multiple vector tension displacement animal restrain system to animal comprising the steps of:
   a. attaching the multiple vector tension displacement animal restrain system of claim 4 to an animal;
   b. adjusting the multiple vector tension displacement animal restrain system based on the dimensions of an animal so as to align the multiple vector tension displacement animal restrain system to provide the least amount of tension on the system and animal.

* * * * *